US006711959B2

(12) United States Patent
Rejewski

(10) Patent No.: US 6,711,959 B2
(45) Date of Patent: Mar. 30, 2004

(54) AIR VELOCITY MEASUREMENT INSTRUMENT

(75) Inventor: Robert S. Rejewski, Brockport, NY (US)

(73) Assignee: Heidelberger Druckmaschinen AG, Heidelberg (DE)

( * ) Notice: Subject to any disclaimer, the term of this patent is extended or adjusted under 35 U.S.C. 154(b) by 91 days.

(21) Appl. No.: 10/000,417

(22) Filed: Nov. 2, 2001

(65) Prior Publication Data

US 2003/0084724 A1 May 8, 2003

(51) Int. Cl.⁷ ................................................. G01F 1/46
(52) U.S. Cl. ..................... 73/861.65; 399/355
(58) Field of Search ........................ 73/861.65, 861.42; 399/343, 353, 355

(56) References Cited

U.S. PATENT DOCUMENTS 6,086,064 A * 7/2000 Biegelsen et al. ..... 271/258.01

* cited by examiner

Primary Examiner—Richard A. Moller

(57) ABSTRACT

An installed or temporarily inserted air flow instrument 48 measures air flow in a pneumatic subsystem of a cleaning station in a copier or printer. The air flow instrument has a pitot tube 52 and a static pressure tube 54. The pitot tube is substantially parallel to the length of in-line adapter 50, is centered within in-line adapter 50, and terminates in impact end 74. Static pressure tube 54 is substantially transverse to the length of in-line adapter 50. Static pressure tube 54 penetrates adapter wall 64 of in-line adapter 50 and is flush with adapter inner surface 66 of in-line adapter 50. The pressure difference at the ends of the pitot and static pressure tube represents a measurement of the air flow in the body of the air flow instrument.

44 Claims, 9 Drawing Sheets

AIR VELOCITY MEASUREMENT INSTRUMENT

TECHNICAL FIELD

This invention relates to air velocity measurement instruments.

BACKGROUND OF THE INVENTION

It is often desirable to know the flow rate and velocity of a fluid in pneumatic systems such as, for example pneumatic servo-systems, vacuum formers, and air handling subsystems of electrophotographic machines (i.e. copy machines). Flow rate and velocity information can be useful in evaluating vacuum sources, in quality control, and in feedback circuits for pneumatic systems.

A vacuumed-brush cleaning subsystem of a copier machine is a typical pneumatic system. This subsystem cleans the copier's photoconductor by mechanically removing the toner with a fiber brush under negative pressure. The negative pressure produced by a vacuum source such as, for example a blower, forces air supplied by the surrounding atmosphere to carry toner particles from the fiber brush through tubing to a device that filters out and collects the toner particles. The air is discharged back to the surrounding atmosphere. It is common for these subsystems to require a particular range for the air flow rate. If the flow rate is too low or too high, many of the toner particles may not flow properly through the system. The air flow rate in a subsystem due to a particular vacuum source depends on the impedance of the subsystem, which is different for each different subsystem configuration. The impedance of the subsystem stems from the shape of the airway and any instruments and devices in the airway that may affect the airflow. For example, a tube with several 90° bends would have a higher impedance than the same tube configured in a straight line. Therefore, when a new subsystem configuration is to be used, vacuum sources must be evaluated to identify an appropriate vacuum source to produce the desired air flow rate range for the configuration.

A flow nozzle differential pressure meter is used to evaluate the vacuum source for air handling subsystems. The flow nozzle type meter includes two large chambers separated by a flow nozzle. There is an inlet to the chamber upstream from the nozzle. The air handling subsystem is attached to the chamber downstream from the nozzle such that air entering the subsystem must travel first through the upstream chamber, then the nozzle, and finally the downstream chamber before entering the subsystem. The flow nozzle presents an obstruction to flow that causes a pressure differential across the obstruction. The static pressure is measured on either side of the nozzle and the meter is calibrated to correlate the static pressure difference with the flow rate of the air. The air flow rate data are recorded as a function of the voltage supplied to the vacuum source and the sources are compared to uncover the most efficient source.

Flow nozzle type meters are accurate and effective for measuring fluid flow rates. However, due to their large size, the air handling subsystem to be tested must be brought offline. Thus, the setup of the test is inconvenient. The large size and high cost also means that it is inefficient and impractical to incorporate the meter into the subsystem.

The combination of a pitot tube and a static pressure tube in various configurations is another common method for the evaluation of the fluid flow rate of an air passage. The pitot tube is usually a tube with one open end facing into the fluid flow and the other end is fluidly connected to a pressure gage such as, for example a manometer. This pressure is called the impact pressure or the total pressure. The static pressure tube is usually a tube with one or more openings near one end of the tube substantially transverse to the direction of flow. The opposite end of the tube is fluidly connected to a pressure gage which displays the static pressure. The difference between the statice pressure and the impact pressure can be correlated to the velocity of the air by equation 1:

$$V=[(2*g*DP)/\rho]^{(1/2)} \quad (1)$$

Where V is velocity, g is gravity, DP is the difference between static pressure and total pressure, and $\rho$ is the density of the air in English units. The density of the air is dependent on the altitude of the measurement relative to sea level.

The flow rate of the air passage can be found by equation 2:

$$Q=V*A \quad (2)$$

Where Q is the flow rate and A is the cross-sectional area of the fluid flow, i.e., the cross-sectional area bound by the inner surface of the passage.

Conventionally, this method is used exclusively in substantially laminar flows. To ensure laminar flow, conventional implementations require that a certain length of the passage preceding and following the measurement be straight and have no substantially abrupt changes in cross-sectional area. This length preceding the measurement should be no less than about 4 times the diameter. The length following the measurement should be no less than about 10 times the diameter. Thus the laminar flow requirement of the pitot tube/static pressure tube method of air flow method makes the instrument too large for the limited space of many machines in which it would otherwise be useful such as, for example electrophotographic machines.

Therefore there is a need for an air flow measuring instrument that can be easily coupled to a pneumatic system or can be incorporated into a system.

SUMMARY OF THE INVENTION

A copier or printing apparatus has a photosensitive member that receives and develops a latent image at a toner station. That station applies toner to the latent image. After the image is transferred to a copy sheet, a cleaner station removes residual toner from the photosensitive member. The cleaning station includes a brush and a vacuum source that remove toner particles and an instrument coupled for measuring the flow of air generated by the vacuum source. In one embodiment the instrument is a permanent part of the copier/printer. In another embodiment, the copier/printer is modified to accept the instrument in the cleaning station. In a more general embodiment, the instrument is adapted for connecting to pneumatic systems other than those of a copier or printer.

The instrument has an in-line adapter including an elongate, substantially rigid hollow body with outer and inner surfaces. The body is open at opposite ends and flow of air in the body is usually only in one direction. The instrument has a pitot tube and a static pressure tube that extend through the walls of the body. The pitot tube extends through the body and has an elongate passageway open at both ends. One open end is known as the impact end. It is inside the body. It faces in a direction substantially opposite to the expected pneumatic flow direction. The impact end is located along the central axis of the body. The other end is outside the body. The static pressure tube also extends through the body. The static pressure tube has an elongate passageway terminating in opposite, open ends. One end is substantially flush with the surface of the in-line adapter. The other end terminates away from the body.

The outer ends of the pitot and static pressure tubes are connected to inputs to a gage. By measuring the pressure differential between the two tubes, one may calculate the flow of air in the body. The air flow measurement can be displayed and can be used as a feedback signal to control the air flow by adjusting the speed of the blower.

BRIEF DESCRIPTION OF THE DRAWINGS

The above-mentioned and other features and advantages of this invention, and the manner of attaining them, will become apparent and be better understood by reference to the following description of the embodiments of the invention in conjunction with the accompanying drawings, wherein.

Corresponding reference characters indicate corresponding parts throughout the several views. The exemplifications set out herein illustrate the preferred embodiments of the invention and such exemplifications are not to be construed as limiting the scope of the invention in any manner.

DESCRIPTION OF THE PREFERRED EMBODIMENTS

Figure 1:
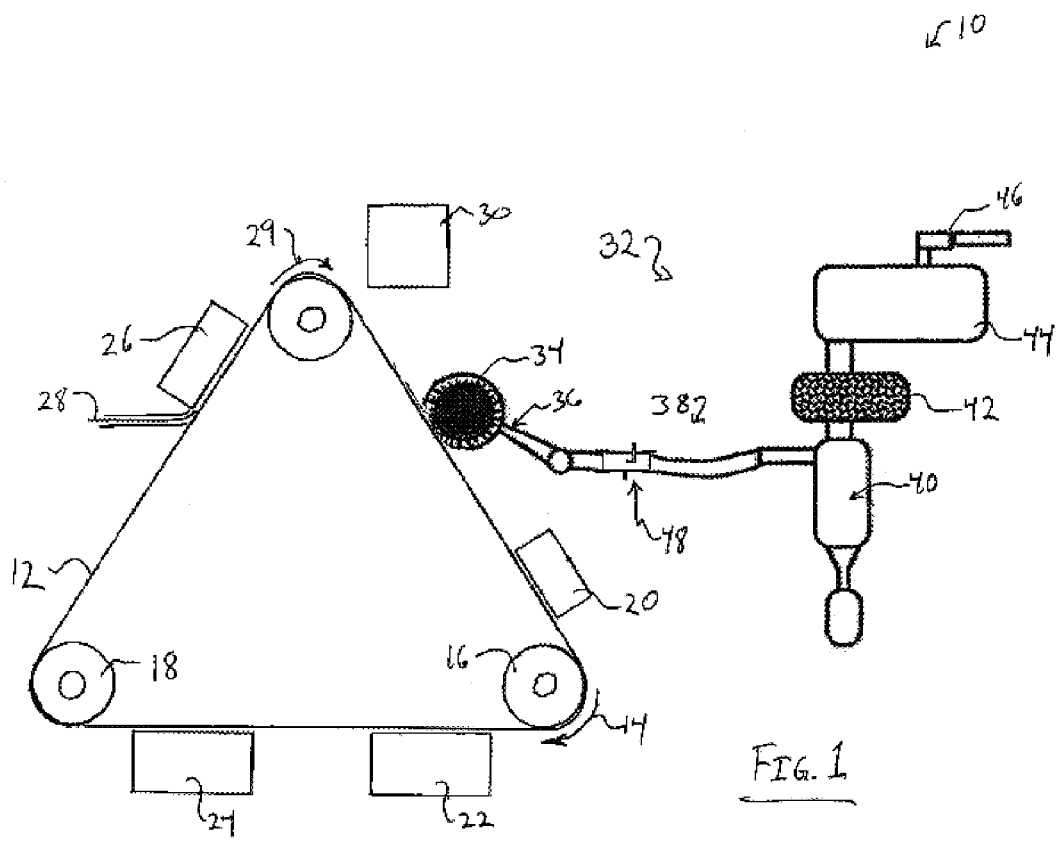
FIG. 1 is a side view of one embodiment of an air velocity measurement instrument as installed in an electrophotographic printing and/or copying machine.

Referring now to the drawings, and particularly to FIG. 1, there is shown an electrophotographic printing and/or copying machine incorporating one embodiment of an air velocity measurement instrument of the present invention.

Electrophotographic printer or copying machine 10 generally includes main belt 12 that rotates through the various functional areas or stations of machine 10. Belt 12 is typically constructed of an electrically conductive material, and has a photoconductive surface deposited thereon or otherwise affixed thereto. Belt 12 is driven in the direction of arrow 14 by drive roller 16, which is driven by a motor (not shown), and is tensioned by tensioning roller 18. A portion of belt 12 is first passed through charging station 20, such as a corona generating device, which charges belt 12 to a predetermined electrical potential that is typically negative. Belt 12 is then rotated to exposure station 22, which selectively discharges the photoconductive surface of belt 12 to thereby form an electrostatic latent image that corresponds to an original to be printed or copied.

The latent image now on the surface of belt 12 is rotated to development station 24, wherein toner particles are brought into contact with the latent image by, for example, magnetic brush rollers, to thereby form a toner image on belt 12. Belt 12 is then rotated to place the toner image within transfer station 26, and an image substrate 28, such as a piece of paper or transparency, is brought into contact with the toner image. Transfer station 26 ionizes or otherwise charges, typically through a corona generating device, image substrate 28 and thereby attracts the toner image to image substrate 28. Image substrate 28 is then passed in the direction of arrow 29 to fusing station 30 wherein the toner image is fused, typically by fusing rollers, to image substrate 28. Image substrate 28 is then separated from belt 12 and is guided to a paper tray for removal from machine 10 by an operator.

Belt 12 is then cleaned of residual toner particles at cleaning station 32. Cleaning station 32 typically includes a charging station that charges to a suitable electrical potential and polarity the residual toner particles remaining on the photoconductive surface of belt 12. Cleaning station 32 further typically includes at least one vacuum-assisted electrostatic cleaning brush 34, brush housing 36, passage 38, collection container 40, filter 42, vacuum source 44, outlet 46, and air velocity measurement instrument 48.

Cleaning brush 34 rotates at relatively high speed to create sufficient mechanical force to remove the residual toner from belt 12. The dislodged residual toner particles and the surrounding air are drawn into brush housing 36 and then passage 38 by vacuum source 36. As the air flow passes through collection container 40 and filter 42, the toner particles are removed from the air. The air flow then continues through vacuum source 44 and outlet 46.

Figure 2:
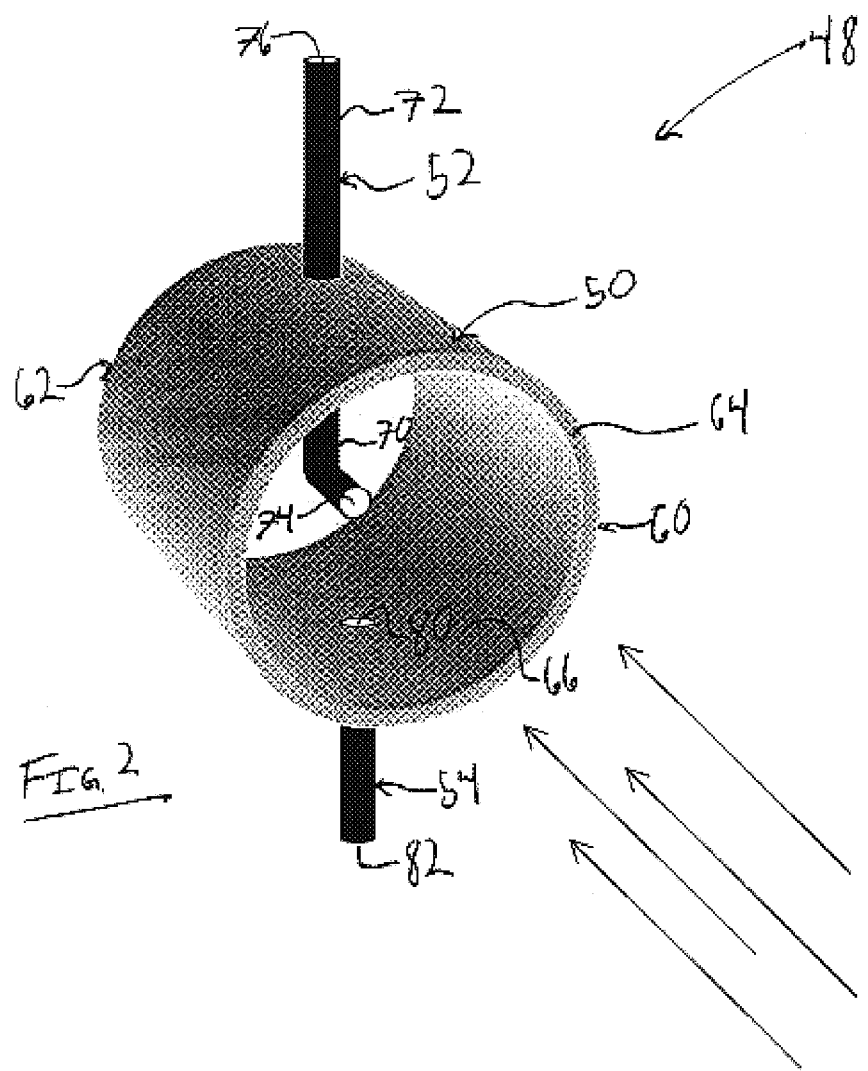
FIG. 2 is a isometric view of one embodiment of the instrument of FIG. 1.

Referring now to FIG. 2, air velocity measurement instrument 48 includes in-line adapter 50, pitot tube 52, and static pressure tube 54.

In-line adapter 50 includes upstream end 60, downstream end 62, adapter wall 64, and adapter inner surface 66.

Figure 3:
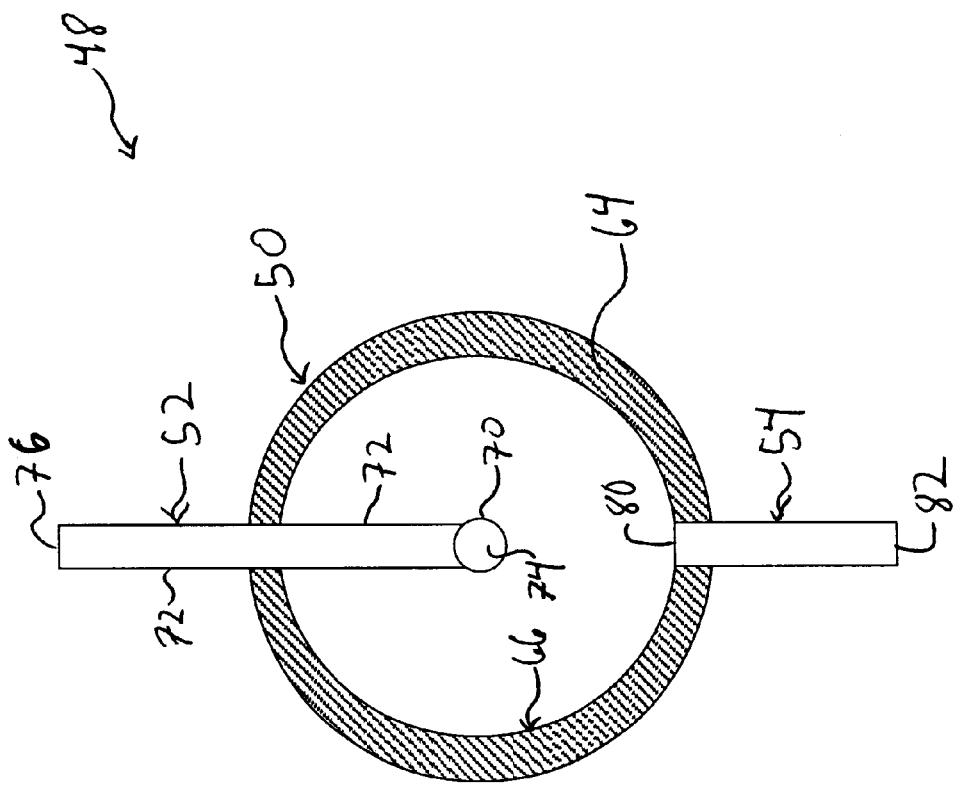
FIG. 3 is a cross-sectional view of the instrument of FIG. 1, transverse to the length of the instrument.

Pitot tube 52 includes first portion 70, second portion 72, impact end 74, and exit end 76. As best shown in FIGS. 2 and 3, first portion 70 of pitot tube 52 is substantially parallel to the length of in-line adapter 50, is substantially centered within in-line adapter 50, and terminates in impact end 74. Second portion 72 of pitot tube 52 is substantially transverse to the length of in-line adapter 50 and is fluidly connected to first portion 70. Second portion 72 protrudes through adapter wall 64 of in-line adapter 50 such that exit end 76 is outside of in-line adapter 50. A sealant such as, for example epoxy surrounds second portion 72 near adapter wall 64 to form a substantially air tight seal between adapter wall 64 and second portion 72. The cross-sectional area of pitot tube 52 is less than or equal to one-half the internal cross-sectional area bound by adapter inner surface 66 of adapter 50.

Figure 4:
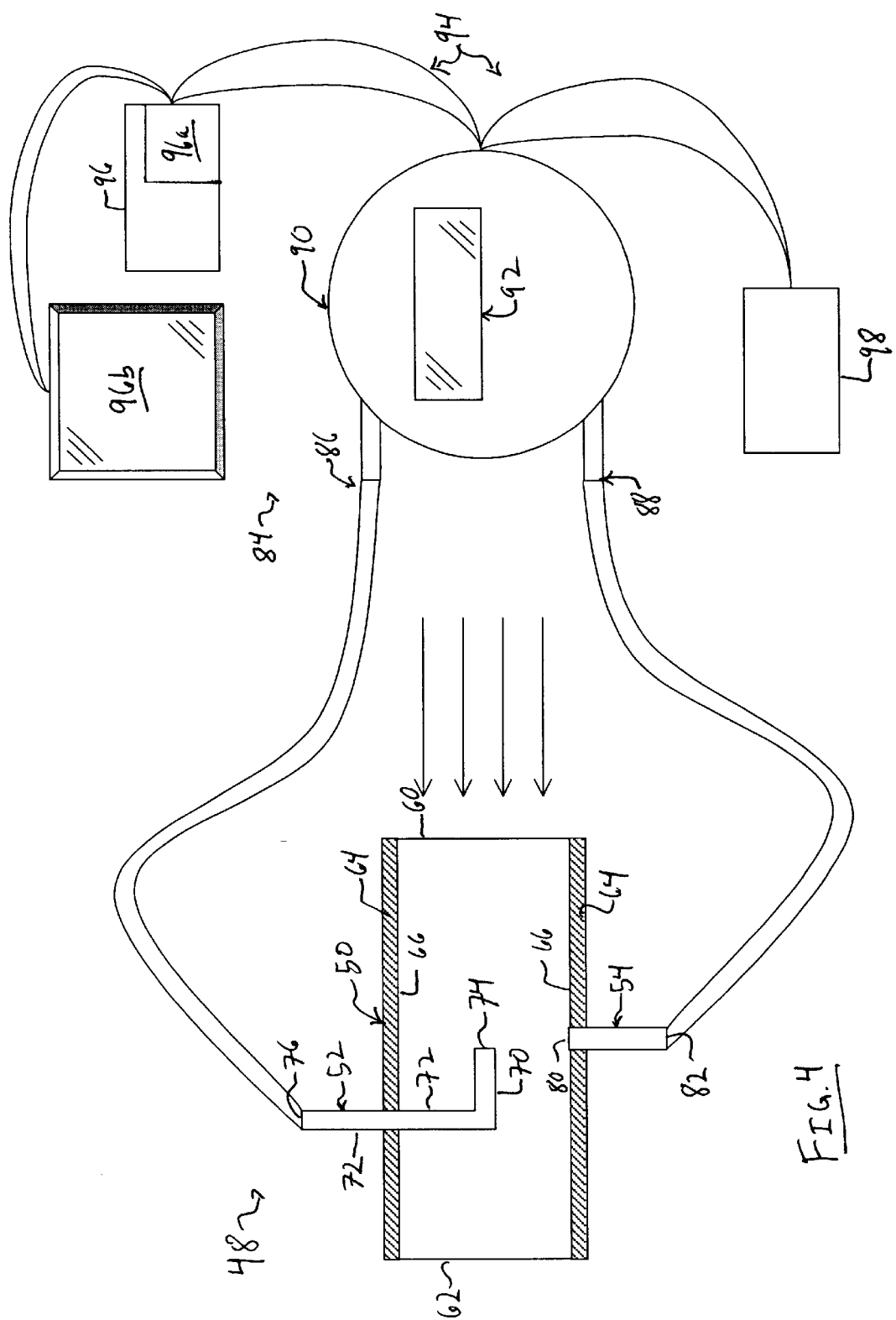
FIG. 4 is a cross-sectional view of the instrument of FIG. 1, parallel with the length of the instrument, including a differential pressure gage.

Referring again to FIG. 2, static pressure tube 54 includes first open end 80 and second open end 82. Static pressure tube 54 is substantially transverse to the length of in-line adapter 50. Static pressure tube 54 penetrates adapter wall 64 of in-line adapter 50 such that first open end 80 is substantially flush with adapter inner surface 66 of in-line adapter 50 as best shown in FIG. 3. A sealant such as, for example epoxy surrounds static pressure tube 54 near adapter wall 64 to form a substantially air tight seal between adapter wall 64 and static pressure tube 54. First open end 80 of static pressure tube 54 is located at substantially the same axial location along in-line adapter 50 as impact end 74 of pitot tube 52 as best shown in FIG. 4. The cross-sectional area of static pressure tube 54 is less than or equal to one-half the internal cross-sectional area bound by adapter inner surface 66 of adapter 50.

Referring now to FIG. 4, there is shown gage 84 that includes first input 86, second input 88, and output 90. Exit end 76 of pitot tube 52 is fluidly connected to first input 86. Second open end 82 of static pressure tube 54 is fluidly connected to second input 88. Output 90 includes at least one of and is not limited to analog or digital display 92 that displays the difference in pressure between first input 86 and second input 88, the difference in pressure between first input 86 and second input 88 as transmitted via an electrical signal through wires 94 to computer 96 or a feedback circuit 98, and the difference in pressure between first input 86 and second input 88 as transmitted via an electromagnetic signal to computer 96 or a feedback circuit 98. Computer 96 includes storage device 96a and computer display 96b.

Figure 5:
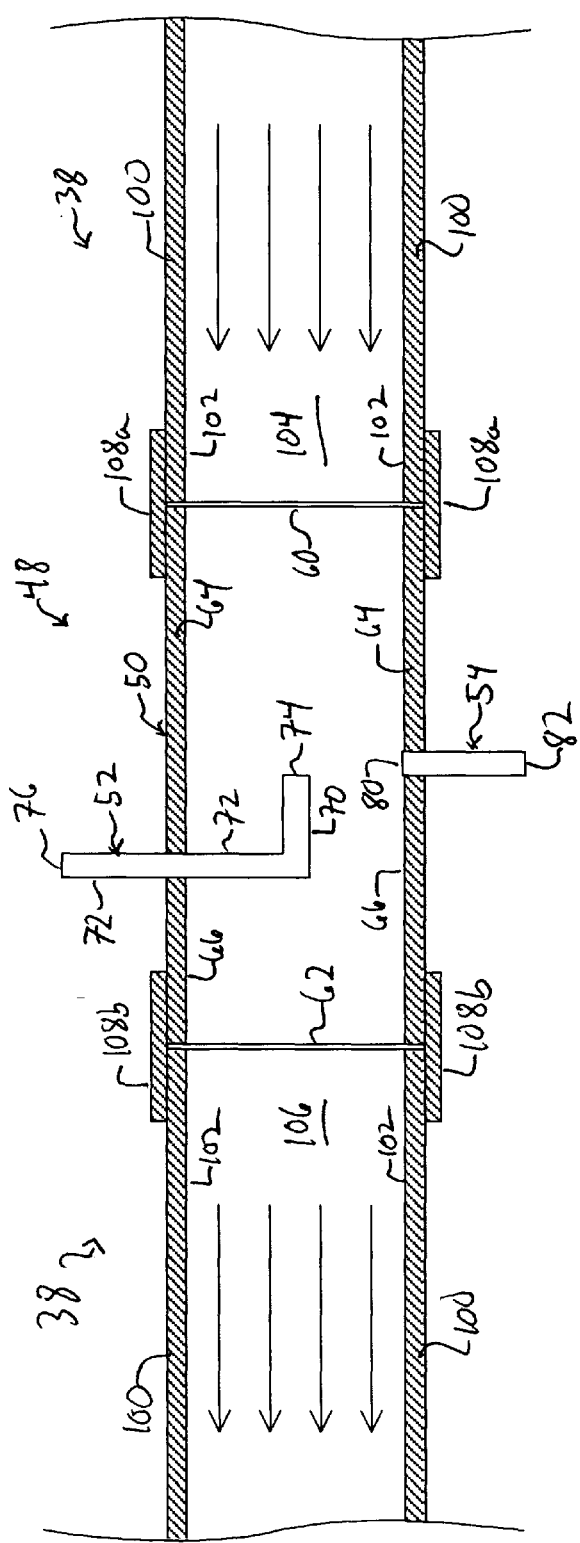
FIG. 5 is a cross-sectional view of the instrument of FIG. 1 installed in a pneumatic passage, parallel with the length of the instrument.
Figure 6:
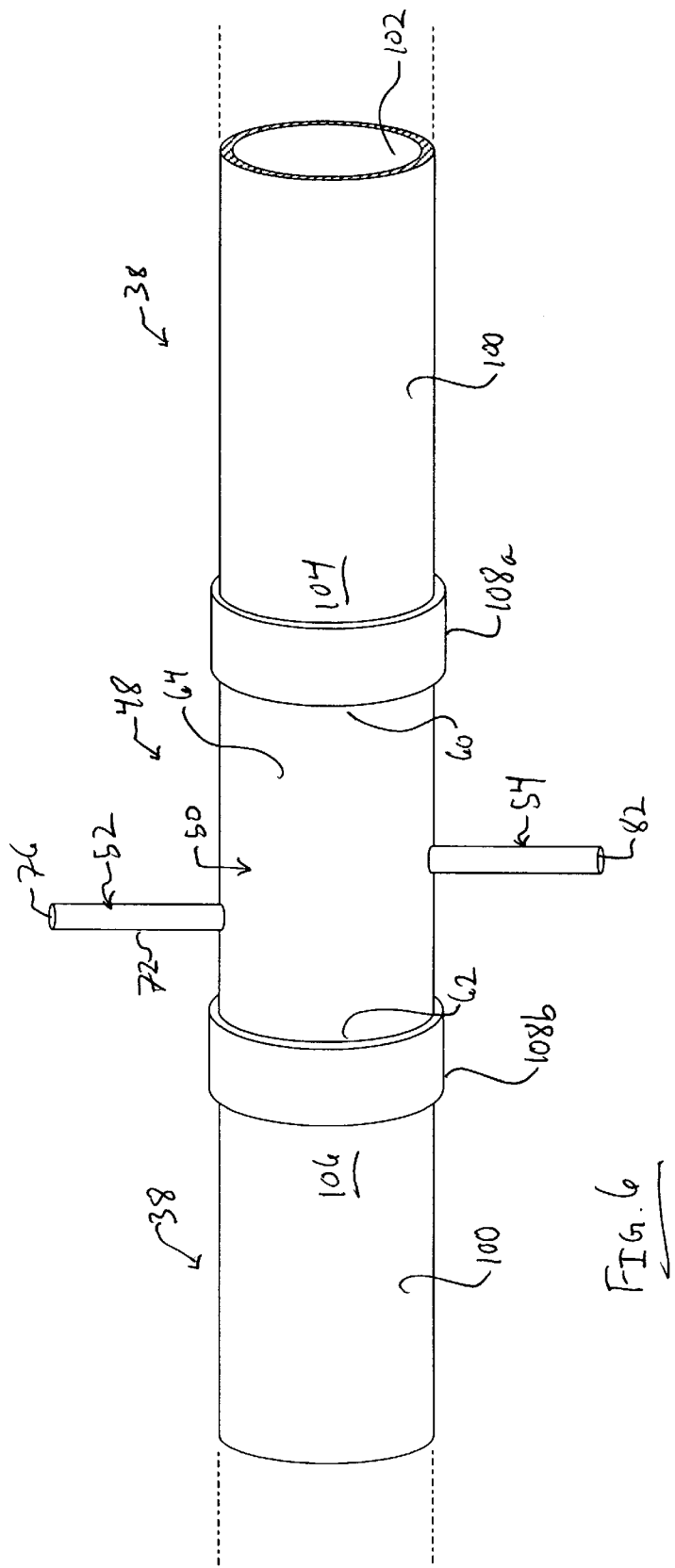
FIG. 6 is an isometric view of the instrument of FIG. 1 installed in a pneumatic passage.

Referring now to FIGS. 5 and 6, instrument 48 is fluidly connected to passage 38 such that impact end 74 is facing the direction substantially opposite the average direction of the fluid flow. Passage 38 includes passage wall 100, passage inner surface 102, upstream portion 104, and downstream portion 106. Upstream collar 108a and downstream collar 108b are also included. In-line adapter 50 has an internal cross-sectional area, which is bound by adapter inner surface 66, that is substantially equal to the cross-sectional area bound by passage inner surface 102 of passage 38. Further, the shape defined by adapter inner surface 66 of in-line adapter 50 is substantially the same as the shape defined by passage inner surface 102 of passage 38. Thus, there is substantially no abrupt change in the size or shape and cross-sectional area of the fluid flow. Upstream collar 108a forms a substantially air tight seal around the connection between upstream end 60 of in-line adapter 50 and upstream portion 104. Similarly, downstream collar 108b forms a substantially air tight seal around the connection between downstream end 62 of in-line adapter 50 and downstream portion 106. Sealants such as, for example epoxy are used where necessary to ensure a substantially air tight seal. In the alternative, one can use threaded connectors with o-ring seals.

In use, air velocity measurement instrument 48 is operably installed in passage 38 such that impact end 74 faces in the direction substantially opposite the direction of fluid flow as shown in FIGS. 4 and 5. A vacuum source impels a gas such as air through passage 38. The flow rate of the gas through passage 38 depends on the impedance of passage 38 caused by any devices and the configuration of the tubing included in passage 38.

As the gas flows through passage 38, static pressure tube 54 and thus second input 88 contains gas at the static pressure due to the transverse orientation of static pressure tube 54 described above. Impact end 74 of pitot tube 52 faces into the flow of gas, therefore gas flows into impact end 74 and thus first input 86 causing an increased pressure in pitot tube 52 and thus first input 86. This increased pressure is called the impact or total pressure.

Gage 84 measures the difference in the impact pressure in first input 86 and the static pressure in second input 88. In the case that output 90 is analog or digital display 92, a user reads the difference in pressure and calculates the velocity of the gas using equation 1 of the background and the flow rate of the gas using equation 2 of the background. Alternatively output 90 sends the pressure difference in an electrical signal via wires 94 or electromagnetic signal to computer 96 that calculates the velocity and the flow rate using equations 1 and 2 respectively. The computer then stores this data in storage device 96a and/or displays this data in computer display 96b. Another alternative is that output 90 sends an electrical signal via wires 94 or electromagnetic signal to feedback circuit 98. An example of a feedback circuit is one that adjusts the voltage of vacuum source 44 according to the differential pressure signal from output 90 i.e., if the differential pressure signal from output 90 is higher than the desired amount, feedback circuit 98 lowers the voltage to vacuum source 44 until the differential pressure equals the desired amount.

Figure 7:
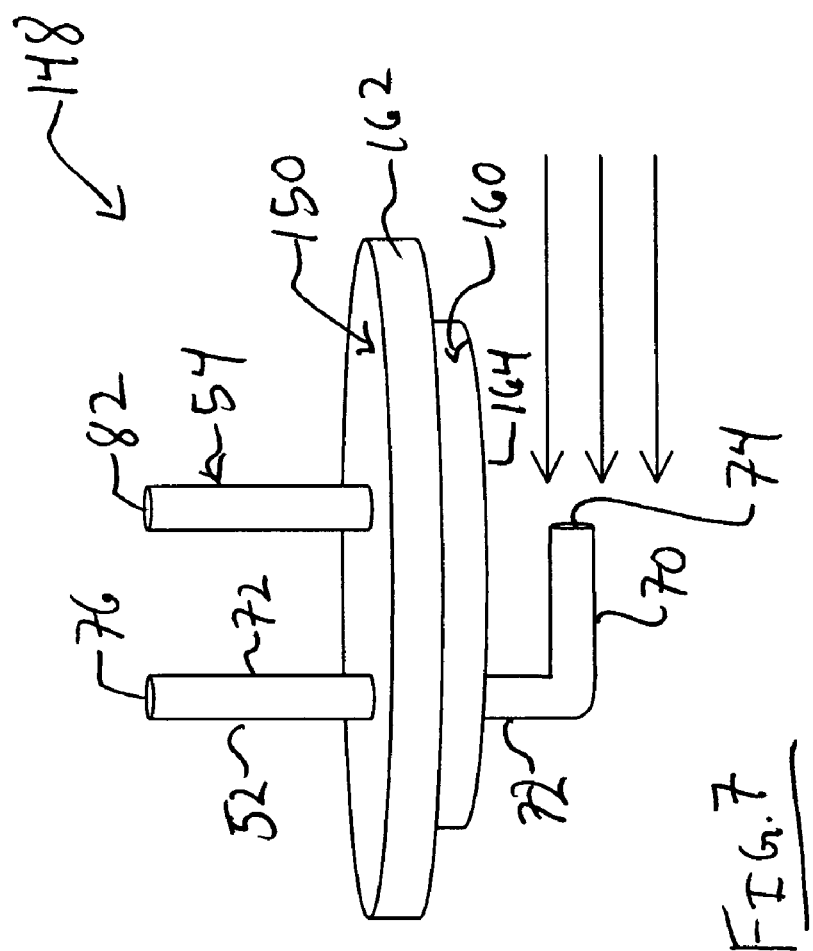
FIG. 7 is an isometric view of a second embodiment of an air velocity measurement instrument.

Referring now to FIG. 7, a second embodiment of an air velocity measurement instrument of the present invention is shown. The same reference numbers are used indicate component parts associated with instrument 148 that are substantially identical in structure and function as those of instrument 48, described above. Instrument 148 includes plug 150, pitot tube 52, and static pressure tube 54.

Figure 8:
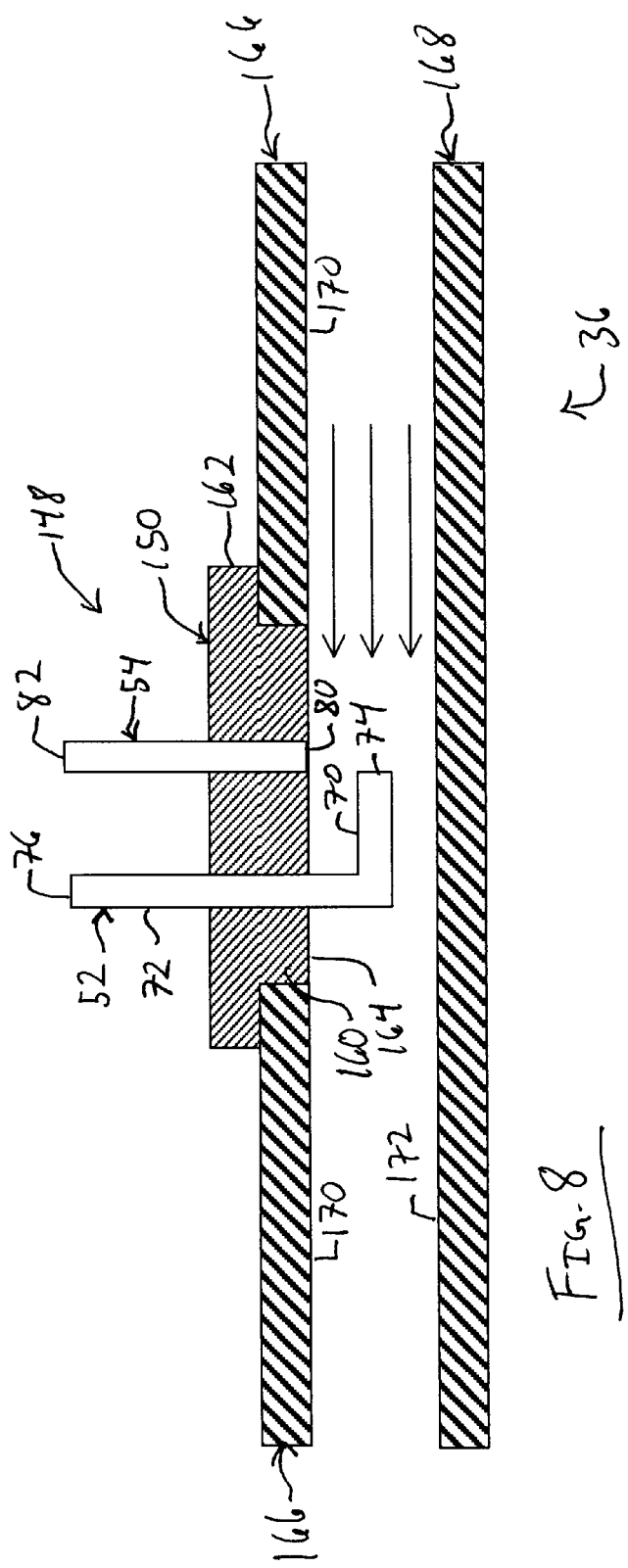
FIG. 8 is a cross-sectional view of the instrument of FIG. 7 as installed in a pneumatic passage.

Plug 150 includes bottom portion 160 and flange portion 162. Bottom portion 160 includes undersurface 164. Second portion 72 of pitot tube 52 protrudes through plug 150 and a sealant such as, for example epoxy forms a substantially air tight seal between flange portion 162 and second portion 72 of pitot tube 52. As best seen in FIG. 8, static pressure tube 54 penetrates plug 150 such that first open end 80 of static pressure tube 54 is substantially flush with undersurface 164. A sealant such as, for example epoxy forms a substantially air tight seal between flange portion 162 and static pressure tube 54.

Referring now to FIG. 8, instrument 148 is shown installed in brush housing 36. Brush housing 36 includes top plate 166 and bottom plate 168. Top plate 166 includes plate undersurface 170 and bottom plate 168 includes plate top surface 172. Instrument 148 is installed in brush housing 36 such that undersurface 164 of bottom portion 160 and thus first open end 80 of static pressure tube 54 is substantially flush with plate undersurface 170 of top plate 166. Further, instrument 148 is pre-configured such that first portion 70 of pitot tube 52 is centered substantially half the distance between plate undersurface 170 of top plate 166 and plate top surface of bottom plate 168.

Figure 9:
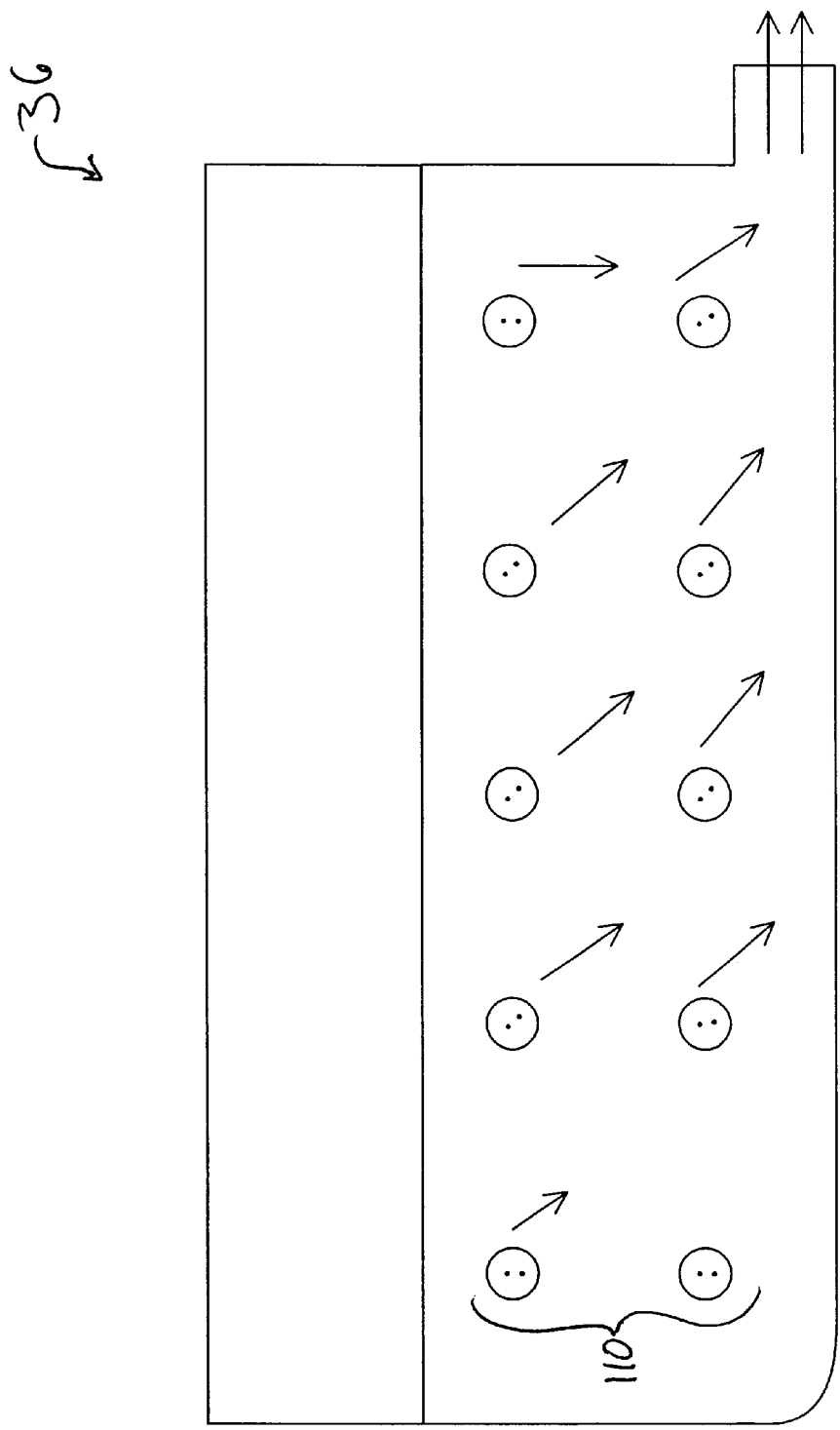
FIG. 9 is a plan view of a plurality of the instruments of FIG. 7 as installed in a pneumatic passage.

As shown in FIG. 9, several instruments 110 are installed in brush housing 36 in order to obtain the fluid velocities and directions over all of brush housing 36.

In use, pitot tube 52 and static pressure tube 54 are fluidly connected to gage 84 as described in the first embodiment above. Instrument 148 is rotated while installed in brush housing 36 and output 90 of gage 84 is monitored. The peak value for output 90 is associated with the position of instrument 148 wherein first portion 70 of pitot tube 52 is facing the direction substantially opposite the direction of the fluid flow. The velocity is found as described in the first embodiment above using the pressure differentials and equation 1. The velocities obtained using the array of instruments 110 shown in FIG. 9 provide a velocity profile for each of the two rows across brush housing 36. Each velocity profile is used in conjunction with the cross-sectional area across the respective row of instruments 110 to evaluate the system performance, i.e., to obtain the impedance of brush housing 36.

In the first embodiment shown, in-line adapter 50 and passage 38 have a substantially circular cross-sectional shape in the drawings. Alternatively, in-line adapter 50 and passage 38 have a non-circular cross-sectional shape such as, for example an ellipse or a polygon.

In the first embodiment shown, in-line adapter 50 is connected to passage 38 by Upstream collar 108a and downstream collar 108b. Alternatively, in-line adapter has an enlarged cross-sectional area at upstream end 60 and downstream end 62 such that a ledge is formed near each of upstream end 60 and downstream end 62. The enlarged cross-sectional area at upstream end 60 fits over upstream portion 104 and upstream portion 104 buts against the ledge formed near upstream end 60. Similarly, the enlarged cross-sectional area at downstream end 62 fits over downstream portion 106 and downstream portion 106 buts against the ledge formed near downstream end 62. Sealants such as epoxy are used to ensure a substantially air tight seal.

In the first embodiment shown, static pressure tube 54 is shown at an angular position 180° from pitot tube 52 on in-line adapter 50. Alternatively, static pressure tube 54 is located at any angular position relative to pitot tube 52.

In the embodiments shown, pitot tube 52 and static pressure tube 54 are attached to in-line adapter 50 or plug 150 with a sealant such as epoxy. Alternatively, pitot tube 52 and static pressure tube 54 are press fit into in-line adapter 50 or plug 150, or threaded to be screwed into in-line adapter 50 or plug 150, or used in conjunction with o-rings to thereby form a substantially air tight seal.

In the embodiments shown, gage 84 is a differential pressure gage that outputs the difference between two pressures. Alternatively, there are two gages, each with one input and at least one output. The first gage is fluidly connected to pitot tube 52 and outputs the impact pressure. The second gage is fluidly connected to static pressure tube 54 and outputs the static pressure. An operator and/or a computer compares the impact pressure and the static pressure output from the gages to obtain the difference in pressure used to find the velocity in equation 1.

It should be particularly noted that the cross-sectional areas used to calculate flow rate from equation 2 should be accurately measured to avoid errors. In addition, neither instrument 48 nor instrument 148 should be placed at elbows, in a location with large inner cross-sectional area differentials, or in or near a location with high turbulence. Also, adapter inner surface 66 of in-line adapter 50, undersurface 164 of bottom portion 160, pitot tube 52, and static pressure tube 54 should be substantially smooth and free of all internal burrs and in-line adapter 50 should be substantially rigid. Furthermore, plug 150 should be installed in a pneumatic passage that is substantially rigid i.e., brush housing 36 should be substantially rigid.

While this invention has been described as having a preferred design, the present invention can be further modified within the spirit and scope of this disclosure. This application is therefore intended to cover any variations, uses, or adaptations of the present invention using the general principles disclosed herein. Further, this application is intended to cover such departures from the present disclosure as come within the known or customary practice in the art to which this invention pertains and which fall within the limits of the appended claims.

What is claimed:

1. A pneumatic velocity measurement instrument, comprising:
   an in-line adapter comprising an elongate, substantially rigid hollow body with outer and inter surfaces and open first and second ends, said in-line adapter having an average expected pneumatic flow direction;
   a pitot tube having an elongate passageway open at both ends, said pitot tube extending through said body of said in-line adapter and having one open end inside said body, facing in a direction substantially opposite to said average expected pneumatic flow direction; and
   a static pressure tube, comprising an elongate passageway terminating in opposite, open ends, with one end of said static pressure tube penetrating said body of said in-line adapter, being substantially flush with said inner surface of said in-line adapter, and extending outward from said body.

2. The instrument of claim 1 wherein:
   the in-line adapter has an adapter central axis;
   the pitot tube has a portion with a pitot tube central axis;
   the portion of said pitot tube includes the open end inside said body of said in-line adapter; and
   the pitot tube central axis is substantially coincident with said adapter central axis.

3. The instrument of claim 1, wherein;
   the one end of said static pressure tube penetrating said body of said in-line adapter has a first axial location on said in-line adapter;
   the one open end of said pitot tube inside said body has a second axial location on said in-line adapter being substantially the same as said first axial location on said in-line adapter.

4. The instrument of claim 1 wherein said pitot tube comprises another open end outside said in-line adapter.

5. The instrument of claim 1 wherein said pitot tube comprises a substantially rigid material.

6. The instrument of claim 1 wherein said pitot tube has a first portion and a second portion, and said first and second portions are substantially transverse to each other.

7. The instrument of claim 1 wherein:
   said in-line adapter comprises an internal cross-sectional area within said inner surface of said in-line adapter; and
   said pitot tube comprises a cross-sectional area being substantially equal to or less than one half of said internal cross-sectional area of said in-line adapter.

8. The instrument of claim 1 wherein:
   said in-line adapter comprises an internal cross-sectional area within said inner surface of said in-line adapter; and
   said static pressure tube comprises a cross-sectional area being substantially equal to or less than one-half of said internal cross-sectional area of said in-line adapter.

9. The instrument of claim 1 wherein said static pressure tube comprises a substantially rigid material.

10. The instrument of claim 1 including a differential pressure gage comprising:
    a first gage input being fluidly connected to said pitot tube;
    a second gage input being fluidly connected to said static pressure tube;
    an output signal proportional to the difference in pressure between said first and second gage inputs.

11. The instrument of claim 10 wherein said gage output signal comprises a visual display.

12. The instrument of claim 10 wherein said gage output signal comprises an electrical signal.

13. The instrument of claim 1 wherein:
    said in-line adapter has an internal cross-sectional area within said inner surface of said in-line adapter; and said internal cross-sectional area is equal to or less than about 5 square inches.

14. The instrument of claim 1 wherein said inner surface of said in-line adapter is substantially smooth.

15. A machine, comprising:
a pneumatic passage having a passage shape and a passage cross-sectional area;
an pneumatic mover in fluid communication with said pneumatic passage for moving gasses through said pneumatic passage and transverse to the cross-sectional area;
a pneumatic velocity measurement instrument installed in said pneumatic passage, said pneumatic velocity measurement instrument, comprising;
an instrument shape being substantially the same as said passage shape;
an instrument cross-sectional area being substantially the same as said passage cross-sectional area;
an in-line adapter having an elongate, substantially rigid hollow body with outer and inner surfaces and open first and second ends, said in-line adapter having an average expected pneumatic flow direction;
a pitot tube, having an elongate passageway open at both ends, said pitot tube extending through said body of said in-line adapter and having one open end inside said body, facing in a direction substantially opposite to said average expected pneumatic flow direction; and
a static pressure tube, having an elongate passageway terminating in opposite, open ends, one end of said static pressure tube penetrating said body of said in-line adapter, being substantially flush with said inner surface of said in-line adapter, and extending outward from said body.

16. The machine of claim 15, wherein:
means coupled to the pneumatic mover for adjusting the output of the pneumatic mover to a desired level of pneumatic flow in said pneumatic passage;
means coupled to the pitot and static pressure tubes for measuring the actual level of pneumatic flow in said pneumatic passage; and
feedback means for changing the output of said pneumatic mover in accordance with the desired and actual levels of pneumatic flow to match the actual level to the desired level.

17. The machine of claim 15 wherein:
the in-line adapter has an adapter central axis;
the pitot tube has a portion with a pitot tube central axis;
the portion of said pitot tube includes said open end inside said body of said in-line adapter; and
the pitot tube central axis is substantially coincident with said adapter central axis.

18. The machine of claim 15, wherein:
the one end of said static pressure tube penetrating said body of said in-line adapter has a first axial location on said in-line adapter;
the one open end of said pitot tube inside said body of said in-line adapter has a second axial location on said in-line adapter being substantially the same said first axial location on said in-line adapter.

19. The machine of claim 15 wherein said pitot tube comprises another open end outside said in-line adapter.

20. The machine of claim 15 wherein said pitot tube comprises a substantially rigid material.

21. The machine of claim 15 wherein said pitot tube has a first portion and a second portion, and said first and second portions are substantially transverse to each other.

22. The machine of claim 15 wherein:
said in-line adapter comprises an internal cross-sectional area within said inner surface of said in-line adapter; and
said pitot tube comprises a cross-sectional area being substantially equal to or less than one-half of said internal cross-sectional area of said in-line adapter.

23. The machine of claim 15 wherein:
said in-line adapter comprises an internal cross sectional area within said inner surface of said in-line adapter; and
said static pressure tube comprises a cross-sectional area being substantially equal to or less than one-half of said internal cross-sectional area of said in-line adapter.

24. The machine of claim 15 wherein said static pressure tube comprises a substantially rigid material.

25. The machine of claim 15 including a differential pressure gage comprising:
a first gage input being fluidly connected to said pitot tube;
a second gage input being fluidly connected to said static pressure tube;
an output signal proportional to the difference in pressure between said first and second gage inputs.

26. The machine of claim 25 wherein said gage output signal comprises a visual display.

27. The machine of claim 25 wherein said gage output signal comprises an electrical signal.

28. The machine of claim 15 wherein said instrument cross-sectional area is equal to or less than 5 square inches.

29. The machine of claim 15 wherein said inner surface of said in-line adapter is substantially smooth.

30. A flattened pneumatic passage, comprising:
a top plate having a top plate undersurface;
a bottom plate having a bottom plate top surface;
an average pneumatic flow direction;
a pneumatic velocity measurement instrument comprising
a plug adapter comprising a substantially circular and rigid bottom portion with a plug undersurface and a flanged portion, said plug adapter installed in said top plate such that said plug undersurface is substantially flush with top plate undersurface;
a pitot tube having an elongate passageway open at both ends, said pitot tube extending through said plug adapter and having one open end below said undersurface and facing a direction substantially opposite to said average pneumatic flow direction; and
a static pressure tube, comprising an elongate passageway terminating in opposite, open ends, with one end of said static pressure tube penetrating said plug adapter, being substantially flush with said undersurface of said bottom portion, and extending outward from said flanged portion.

31. The passage of claim 30 wherein:
the pitot tube has a portion with a pitot tube central axis;
the portion of said pitot tube includes the one open end below said undersurface of said plug adapter; and
the pitot tube central axis is substantially equidistant from said top plate undersurface and said bottom plate top surface.

32. The passage of claim 30, wherein the one end of said static pressure tube penetrating said plug adapter is substantially directly above the one open end of said pitot tube below said undersurface.

33. The passage of claim 30 wherein said pitot tube comprises another open end above said flanged portion.

34. The passage of claim 30 wherein said pitot tube comprises a substantially rigid material.

35. The passage of claim 30 wherein said pitot tube has a first portion and a second portion, and said first and second portions are substantially transverse to each other.

36. The passage of claim 30 wherein said static pressure tube comprises a substantially rigid material.

37. The passage of claim 30 including a differential pressure gage comprising:

a first gage input being fluidly connected to said pitot tube;

a second gage input being fluidly connected to said static pressure tube;

an output signal proportional to the difference in pressure between said first and second gage inputs.

38. The passage of claim 37 wherein said gage output signal comprises a visual display.

39. The passage of claim 37 wherein said gage output signal comprises an electrical signal.

40. A pneumatic velocity measurement device, comprising:

an in-line adapter comprising an elongate, substantially rigid body with a top plate with an undersurface, a bottom plate with a top surface and open first and second ends, said in-line adapter having an average expected pneumatic flow direction;

a pitot tube having an elongate passageway open at both ends, said pitot tube extending through said body of said in-line adapter and having one open end inside said body, facing in a direction substantially opposite to said average expected pneumatic flow direction; and a static pressure tube, comprising an elongate passageway terminating in opposite, open ends, with one end of said static pressure tube penetrating said body of said in-line adapter, being substantially flush with said undersurface of said in-line adapter, and extending outward from said body.

41. The device of claim 40 wherein:

the pitot tube has a portion with a pitot tube central axis;

the portion of said pitot tube includes the one open end below said undersurface; and the pitot tube central axis is substantially equidistant from said top plate undersurface and said bottom plate top surface.

42. The device of claim 40, wherein the one end of said static pressure tube penetrating said plug adapter is substantially directly above the one open end of said pitot tube below said undersurface.

43. A pneumatic velocity measurement instrument in accordance with claim 1, further comprising:

a photocopier apparatus having a photosensitive member for receiving a latent image, a toner station for applying toner to the latent image, a transfer station for transferring the latent image to a copy sheet, a cleaner station for removing untransferred toner from the photosensitive member, said cleaning station including a brush and a vacuum source for removing toner particles, and wherein the instrument is coupled to the cleaning station for measuring the flow of air generated by the vacuum source.

44. A machine in accordance with claim 15, further comprising:

a photocopier apparatus having a photosensitive member for receiving a latent image, a toner station for applying toner to the latent image, a transfer station for transferring the latent image to a copy sheet, a cleaner station for removing untransferred toner from the photosensitive member, said cleaning station including a brush and a vacuum source for removing toner particles, and wherein the machine is coupled to the cleaning station for measuring the flow of air generated by the vacuum source.

* * * * *